June 2, 1970  MASAO ANDO  3,515,837

HEAT GENERATING PIPE

Filed March 30, 1967  2 Sheets-Sheet 1

INVENTOR
MASAO ANDO

BY *Paul M. Craig, Jr.*
ATTORNEY

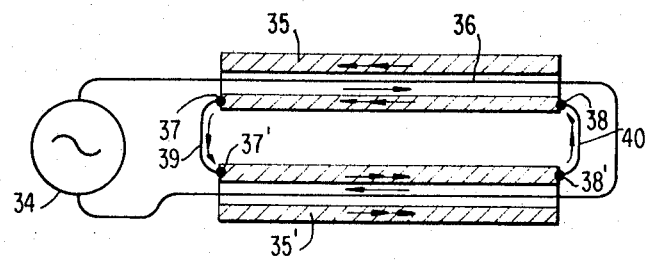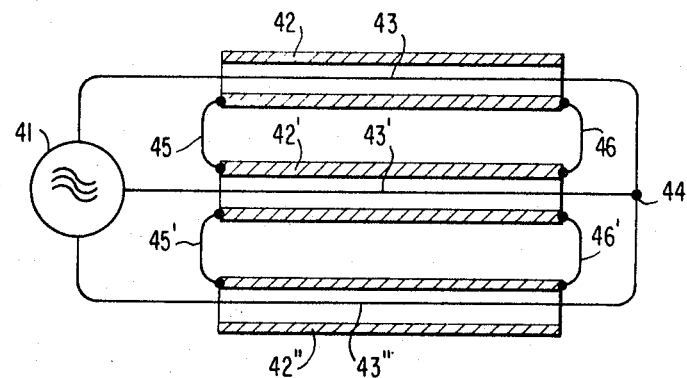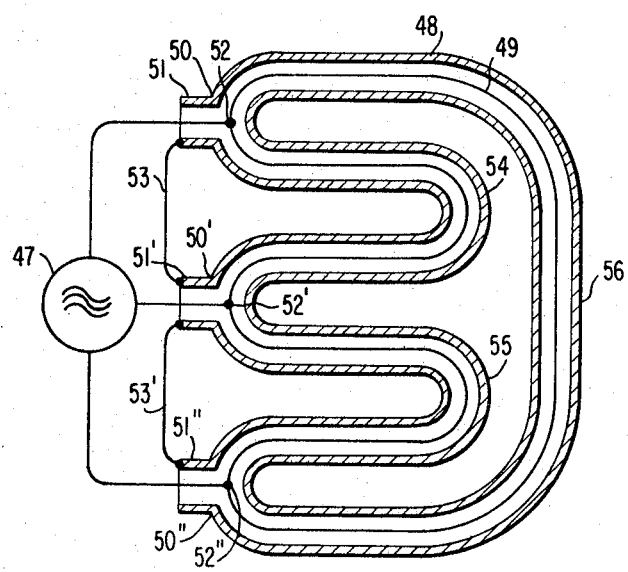

United States Patent Office 3,515,837
Patented June 2, 1970

3,515,837
HEAT GENERATING PIPE
Masao Ando, Yokohamashi, Japan, assignor to
Chisso Corporation, Osaka, Japan
Continuation-in-part of application Ser. No. 538,040,
Mar. 28, 1966. This application Mar. 30, 1967, Ser.
No. 627,086
The portion of the term of the patent subsequent
to Nov. 12, 1985, has been disclaimed
Claims priority, application Japan, Apr. 1, 1966,
41/20,427
Int. Cl. H05b 5/00, 9/00
U.S. Cl. 219—10.49                                10 Claims

ABSTRACT OF THE DISCLOSURE

A heat generating pipe comprising an arrangement including at least one pipe of ferromagnetic metal, the ends of which are electrically connected to form a secondary current circuit and an electric conductor line connected to a source of A.C. supply, inserted within said pipe throughout the entire length of said pipe in electrically insulated relation from said pipe and a method for heating various objects by use of said heat generating pipe which generates heat by the induction current concentrated solely on the inner wall portion of said pipe and causing substantially no electric potential to appear on the outer wall portion of said pipe.

---

This application is a continuation-in-part of application Ser. No. 538,040, filed Mar. 28, 1966, now Pat. No. 3,410,977, issued Nov. 12, 1968.

CROSS-REFERENCE

Japanese Pat. No. 460,224 corresponding to U.S.P. 3,293,407; Japanese patent application No. 20,126/1965 corresponding to U.S. Ser. No. 538,040, now Pat. No. 3,410,977.

BRIEF SUMMARY OF THE INVENTION

This invention relates to a heat generating pipe comprising an arrangement including at least one pipe of ferromagnetic metal, the ends of which are electrically connected to form a secondary current circuit and an electric conductor line connected to a source of A.C. supply, inserted within said pipe throughout the entire length thereof in its longitudinal direction in electrically insulated relation from said pipe and a method for heating various objects with said heat generating pipe by concentrating the induction current solely on the inner wall portion of said pipe and causing substantially no electric potential to appear on the outer wall portion of said pipe.

DETAILED EXPLANATION

It is an object of the present invention to provide an electric heat generating pipe having an extremely simple construction but a high energy efficiency. It is another object of the present invention to provide a heat generating pipe which is not necessary to be electrically insulated from a supporting material thereof or a material to be heated therewith in its installation and easy in its maintenance because there is substantially no electric potential appearing on the outer surface and hence substantially no current leakage even if it is installed in the direct contact with such a supporting material or a material to be heated. It is a further object of the present invention to provide a heat generating pipe which can be readily installed with a highest grade of reliability and affording easy maintenance for the purpose of heating the surface of high speed road or the run field of air craft where freezing or snow drift must be avoided, the wall or floor of the building and, as a tracing pipe, a transportation pipe for viscous liquid or the like.

It is still a further object of the present invention to provide a heat generating pipe which has overcome the difficulty of corrosiveness at the junction point between the different materials, the ferromagnetic metal and the conductor which has been encountered in the heat generating pipe of the prior inventions of the present inventor.

These objects and other advantages can be attained by the heat generating pipe of the present invention.

The heat generating pipe of the present invention consists in the arrangement including one or more than one pipe of ferromagnetic metal having an inner wall portion, outer surface portion and a wall thickness greater than twice the penetration depth of alternating current flow through the inner wall portion of said pipe and a conductor line connected to a source of A.C. supply and inserted within said pipe throughout the entire length thereof in electrically insulated relation from the inner wall portion of said pipe, the ends of said pipe being electrically connected with another conductor having an impedance as low as possible in such a way that the alternating current flowing through the conductor line induces induction current which flows solely through the inner wall portion of said pipe on account of the skin effect, whereby said pipe is heated and the outer surface portion of said pipes receives solely the heat so generated without any substantial amount of electric current flow therethrough, thereby any provision of electrically insulating means on the outer surface of said pipe being obviated.

FIG. 5 is a longitudinal cross-sectional view of a further embodiment of the present invention;

FIG. 6 is a longitudinal cross-sectional view of another embodiment of the present invention; and FIG. 7 is a longitudinal cross-sectional view of still another embodiment of the present invention.

It is well-known that when an alternating current flows through a conductor, the current concentrates on the surface of the conductor and shows a so-called skin effect. When the skin effect is pronounced, the depth of the skin $S$ (cm.) in which a current flows can be expressed by a formula $$S = 5030 \sqrt{\frac{\rho}{\mu f}} \quad (1)$$

wherein $\rho$ ($\Omega$-cm.) is a resistivity of a conductor, $\mu$ is a permeability and $f$ (cycle/sec.) is a frequency.

When an alternating current is supplied to a conductor line, inserted within a pipe of ferromagnetic metal throughout the entire length thereof in electrically insulated relation from said pipe and the current which flows through said pipe is caused to concentrate on the inner wall portion of said pipe by the skin effect, there will be substantially no current flow on the outer surface portion of said pipe so long as the relations expressed by formulas $$\left.\begin{array}{l} t > 2S \\ D \gg S \\ l \gg D \end{array}\right\} \quad (2)$$

wherein D (cm.) is an inside diameter of said pipe, t (cm.) is its thickness and l (cm.) is its length, are satisfied. When a commercial steel pipe is used as a pipe of ferromagnetic metal and an alternating current of commercial frequency (50 or 60 cycles) is applied, the depth of the skin calculated by the formulas is about 1 mm. Accordingly, there will be substantially no current flow on the surface of a pipe so long as its thickness is more than 2 mm.

In the heat generating pipe for oil transportation pipe disclosed by the present inventor in the specification of Japanese Pat. No. 460,224 corresponding to U.S.P. No. 3,293,407 and heating elements also disclosed by the present inventor in a copending Japanese patent application No. 20,126/1965 corresponding to U.S. S.N. 538,040, now Pat. No. 3,410,977, there are proposed a circuit of heat generating pipe consisting of an insulated conductor inserted within ferromagnetic metal pipe throughout the entire length thereof, connected to a source of A.C. supply, and said ferromagnetic metal pipe, as a return path to said source of A.C. supply, formed by connecting the end of said conductor with the end of said pipe at the side far from said source of A.C. which generates heat by the electric resistance of the current flowing only on the inner wall portion of said pipe on account of the skin effect.

Figure 1:
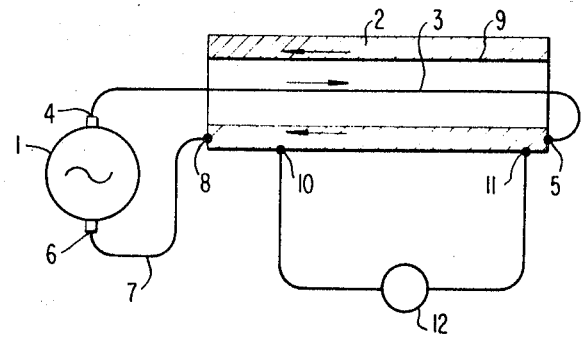
FIG. 1 is a schematic diagram showing a longitudinal cross-sectional view of one embodiment in accordance with the present invention.

FIG. 1 is a schematic diagram showing a longitudinal cross-section view and an electric connection of the above-mentioned heat generating pipe. In FIG. 1, 1 is a source of A.C. supply and 2 is a ferromagnetic pipe. 3 is a conductor line, connected to a terminal 4 of the source 1, inserted within the ferromagnetic pipe 2 throughout the entire length thereof in electrically insulated relation from the inner wall of said pipe. The end of the conductor line is electrically connected to the end 5 of said pipe at the side far from the source. The other end 8 of said pipe is connected to the other terminal of the source 1 with a conductor line 7, thus forming an electric circuit starting from the terminal 4, passing through the conductor line 3, the pipe 2 and the conductor line 7, and ending at the terminal 6. When an alternating current is supplied to this circuit from the source 1, the current flowing through the pipe 2 is concentrated on the inner wall portion of said pipe, and hence there is substantially no potential appearing on the outer surface of said pipe. For example, another conductor line is connected at 10 and 11, any two points, on the outer surface of the pipe and to a voltmeter 12. The meter does not show any appreciable potential.

Figure 2:
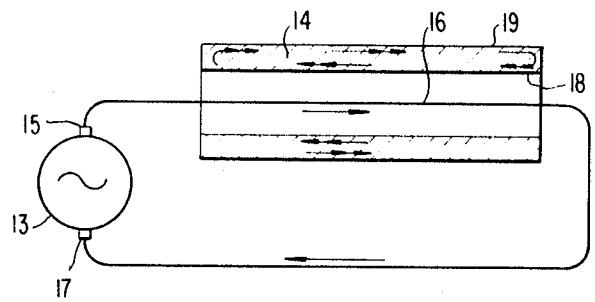
FIG. 2 is a schematic diagram showing a longitudinal cross-sectional view of another embodiment of the present invention.

FIG. 2 is a schematic diagram showing a longitudinal cross-sectional view of the heat generating pipe whose electric connection is not satisfactory. In FIG. 2, 13 is a source of A.C. supply and 14 is a ferromagnetic pipe. When a conductor line 16 insulated relative to the pipe 14 is passed through the pipe 14 on its one way, placed outside the pipe on its return way and both of its ends are connected to the terminals 15 and 17 to form a circuit. When an alternating current is supplied to this circuit, a secondary current having the substantially same strength but whose direction of flow is opposite is induced on the inner wall portion of said pipe. This current flows from the inner wall portion of said pipe, through one end of said pipe to the outer surface 19 of said pipe as shown by arrow marks. Thus a circuit is formed between the inner wall portion and the outer surface portion of said pipe. Accordingly, the secondary current leaks into a body contacting the outer surface of said pipe.

Figure 3:
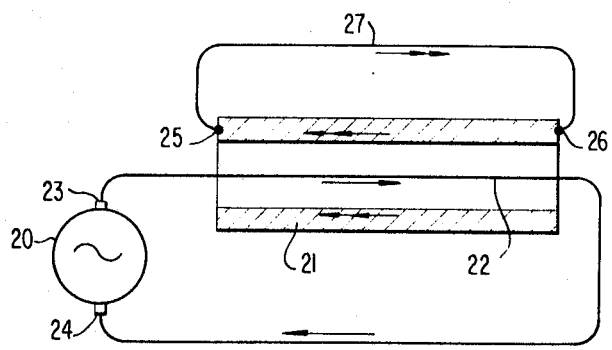
FIG. 3 is a longitudinal cross-sectional view of a further embodiment of the present invention.

FIG. 3 is a schematic diagram showing the longitudinal cross-sectional view and electric connection of the one embodiment of the present heat generating pipe. In this figure, 20 is a source of A.C. supply, 21 is a ferromagnetic metal pipe and 22 is a conductor line electrically insulated relative to said pipe, connected to both the terminals 23 and 24 of the source at both its ends and inserted within said pipe 21, thus forming a primary circuit. Both the ends of said pipes 25 and 26 are electrically connected with another conductor having an impedance close to zero, less than $10^{-2}\Omega$, to form a secondary circuit. When an alternating current is supplied to the primary circuit, a secondary current is induced in the secondary circuit formed by said pipe 21 and the conductor 27. On account of the skin effect, the secondary current flowing through said pipe 21 is concentrated on the inner wall portion, and outside of said pipe, it flows through the conductor 27, hence there is substantially no potential appearing on the outer surface so long as said pipe 21 satisfies the conditions expressed by the above-mentioned Equation 2. Accordingly, even when said pipe is brought to contact with a material to be heated or a supporting material, there is substantially no leakage of current.

As can be seen from the illustrations of FIGS. 3 and 1, the present heat generating pipe is different from that of the prior applications of the present inventor and has overcome the electrolytic corrosion problem at the junction points between the ferromagnetic pipe and the conductor, encountered in the heat generating pipe of the prior applications.

It is ideal that the conductor connecting both the ends of ferromagnetic metal pipe has zero impedance but there is actually no such conductor. So, in order to make the impedance of this conductor as low as possible, such an arrangement is taken that both the ends of said pipe is located as close as possible thereby to reduce the length and the electric resistance of the conductor while using as good a conductor as possible. The above-mentioned arrangement is generally economical also in the point of installation of the heat generating pipe.

Figure 4:
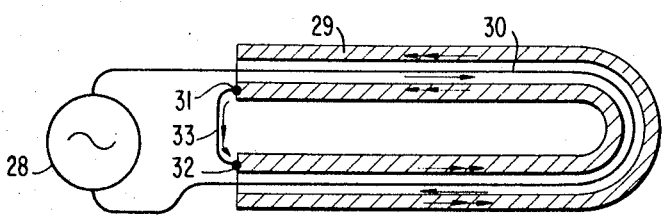
FIG. 4 is a longitudinal cross-sectional view of still another embodiment of the present invention.

As embodiments of the above-mentioned concept, when one heat generating pipe is to be used in the single phase A.C. supply, said pipe may take advantageously U-form as shown in FIG. 4, wherein 28 is a source of A.C. supply and 29 is a ferromagnetic metal pipe bent in U-form. Through said pipe, there is passed a conductor line 30 electrically insulated relative to the inner wall of said pipe 29, both the ends of which are connected to both the terminals of the source 28 to form a primary circuit. Both the ends 31 and 32 of said U-form pipe 29 positioned at a close distance from each other, are connected with a low impedance conductor 33 to form a secondary circuit. When an alternating current is supplied to the primary circuit, a current having the substantially same strength but whose direction is opposite to the primary, is induced in the secondary circuit as indicated by arrow in the drawing. The secondary current flowing through said pipe 29 is concentrated on the inner wall portion of the pipe and there is substantially no potential appearing on the outer surface of the pipe so long as the conditions expressed by the Equation 2 are satisfied. Even if other materials are brought to direct contact with the outer surface of the pipe 29, there is practically no leakage of current to these materials.

Besides the above-mentioned U-form pipe as a method for reducing the impedance of the conductor connecting the ferromagnetic pipe in the practice of the present invention using a single phase current, it is also possible to use a single pipe bent an odd number of times in U-form or an even number of pipes having nearly the same length and arranged in parallel position.

FIG. 5 shows a longitudinal cross-sectional view and electric connection of the case where two ferromagnetic pipes are used as the heat generating pipe and a single phase A.C. is supplied from the source. In this figure, 34 is a source of A.C. supply and 35 and 35' are two ferromagnetic pipes arranged in parallel relation. Within these pipes, there is passed a conductor line 36 which is electrically insulated relative to the pipes and whose ends are connected to the terminals of the source 34. Further both the ends 37 and 38 of the pipe 35 are connected to both the ends 37' and 38' of the pipe 35' with low impedance conductors 39 and 40 thus to form a secondary circuit in the order of arrangement, the pipe 35, the end of the pipe 37, the conductor 39, the end of the pipe 37′, the pipe 35′, the end of the pipe 38′, the conductor 40 and the end of the pipe 38. When an A.C. current is supplied to the primary circuit, the secondary current induced in the secondary circuit is concentrated solely on the inner wall portion of these pipes on account of the skin effect while it flows the inner parts of the pipes 35 and 35′, and any substantial amount of electric potential does not appear on the outer surface of the pipe so long as the conditions of Equation 2 are satisfied.

Three phase alternating current may be also used in the source. FIG. 6 shows the longitudinal cross sectional view of three heat generating pipes and their electric connection in the case where a three phase A.C. current is supplied from a source. In this figure, 41 is a source of A.C. supply, and 42, 42′ and 42″ are three ferromagnetic pipes arranged in parallel relation to each other. Each one of conductors 43, 43′ and 43″, connected to each one of the terminals of the source is passed through each one of the pipes 42, 42′ and 42″ in the relation insulated relative to these pipes and these three conductors are connected at a point 44 to form a primary circuit. Both the ends of pipes 42 and 42′, and both the ends of pipes 42′ and 42″ are connected with low impedance conductors 45 and 46, and 45′ and 46′, respectively to form a secondary circuit. When a three phase A.C. is supplied to the primary circuit, there is induced in the secondary circuit an induction current which is concentrated during the path of the ferromagnetic pipes solely on the inner wall portion of the pipe. There is substantially no electric potential appearing on the outer surfaces of the pipes.

As above-explained, the heat generating pipe of the present invention has a very simple construction, and the metal pipe possessing such a extent of magnetic property as that of commercial steel pipe will be sufficient. For example when a commercially available steel pipe is used, it will be sufficient so long as its thickness is more than 2 mm. Even the alternating current possessing commercial frequencies can be sufficiently used with such a pipe. There is no special need of producing an alternating current of higher frequency.

As conductors for the primary circuit, a commercially available electric wire insulated with natural or synthetic rubber, polyolefins such as polyethylene, polypropylene, or the like, polyhaloolefins such as polyvinyl chloride, poly fluoroethylene or the like, polyamide resin, polyester resin, glass fibers or the like are illustrated. When such a wire is used, there is no need of adding further insulation to the part between the ferromagnetic metal pipe and the conductor.

The temperature range in which the present heat generating pipe can be applied depends upon the kinds of insulating material. For example, wires insulated with natural or butadiene type synthetic rubber or polyvinyl chloride are preferably used at a temperature lower than 60° C., and those insulated with polypropylene can be used at a temperature higher than 100° C. When a higher temperature than 150° C. is necessary, the use of polyfluoroethylene as an insulator is preferable.

As explained so many times in the foregoing description, since any substantial amount of electric potential does not appear on the outer surface of the pipe, it is possible to install the heat generating pipe by integrally contacting it to the material to be heated, by tightly binding it with metal bands, or by welding it to the material to be heated or the like. Accordingly, the method of installation is extremely simple. With this simplicity of installation together with the simple construction, the present heat generating pipe affords an economical heating method of highest grade of reliability, and easy maintenance.

Several examples are given together with its installation method as to the cases of heating method wherein the present heat generating pipe is applied.

When the present heat generating pipes are applied to the surface of wall or floor, the road surface or the run field of aircraft where snow drifting or freezing is abominable, they are arranged at an appropriate distance as a part of reinforcement steel of ferroconcrete and covered with concrete in building the construction. Another useful commercial application of the present heat generating pipe is the heating and maintenance of elevated temperature for the transportation pipe of liquid particularly the material which solidifies at a low temperature, e.g. solid paraffin, asphalt, naphthalene, glacial acetic acid, highly concentrated aqueous solution of caustic soda or the material which is so viscous that loses its fluidity at a low temperature e.g. a heavy oil or a certain kind of crude oil. In such a case the heat generating pipe can be brought to intimate contact with the transportation pipe e.g. by binding with metal bands, by welding it with the wall of the transportation pipe. The welding method is preferable because it enables to improve the heat transmission.

What is claimed is:

1. A heat generating pipe having an arrangement including a primary circuit of an electric conductor line connected to a source of A.C. supply and inserted within at least one pipe of ferromagnetic metal throughout the entire length thereof in electrically insulated relation from the inner wall portion of said pipe and a secondary circuit consisting of said at least one pipe of ferromagnetic metal and at least one conductor having an impedance as low as possible and connecting the ends of said pipe, the secondary alternating current induced in the secondary circuit by the primary current being concentrated on the inner wall portion of said pipe on account of the skin effect while satisfying the relations expressed by equations, $$S = 5030\sqrt{\frac{\rho}{\mu f}}$$

$$t > 2S$$

$$D \gg S$$

$$l \gg D$$

wherein S is a penetration depth (cm.) of the current flowing the pipe of ferromagnetic metal on account of the skin effect, $\rho$ is a resistivity ($\Omega$-cm.) of the material of said pipe, $\mu$ is the magnetic permeability, $f$ is a frequency (cycles/sec.) of said pipe, D is an inside diameter (cm.) of said pipe and $l$ is a length (cm.) of said pipe, whereby said pipe is heated by the secondary current flowing through the inner wall portion thereof on account of the skin effect and the outer surface portion of said pipe receives solely the heat so generated without any substantial amount of electric current flow therethrough.

2. A heat generating pipe according to claim 1, wherein said pipe is one pipe bent an odd number of times in U form.

3. A heat generating pipe according to claim 1, wherein said pipe is a plural number of pipes and both the ends of the pipes are located at as close positions as possible.

4. A heat generating pipe according to claim 1, wherein said pipe is a steel pipe.

5. A heat generating pipe according to claim 1, wherein said source of A.C. supply supplies a single phase A.C.

6. A heat generating pipe according to claim 1, wherein said source of A.C. supply supplies a three phase A.C.

7. A method for heating a liquid transportation pipe comprising heating said pipe with the tracing of a heat generating pipe having an arrangement including a primary circuit of an electric conductor line connected to a source of A.C. supply and inserted within at least one pipe of ferromagnetic metal throughout the entire length thereof in electrically insulated relation from the inner wall portion of said pipe and a secondary circuit consisting of said at least one pipe of ferromagnetic metal and at least one conductor having an impedance as low as possible and connecting the ends of said pipe, the secondary alternating current induced in the secondary circuit by the primary current being concentrated on the iner wall portion of said pipe on account of the skin effect while satisfying the relations expressed by equations, $$S = 5030\sqrt{\frac{\rho}{\mu f}}$$

$$t > 2S$$

$$D \gg S$$

$$l \gg D$$

wherein S is a penetration depth (cm.) of the current flowing the pipe of ferromagnetic metal on account of the skin effect, $\rho$ is a resistivity ($\Omega$-cm.) of the material of said pipe, $\mu$ is a magnetic permeability, $f$ is a frequency (cycles/sec.) of said pipe, D is an inside diameter (cm.) of said pipe and $l$ is a length (cm.) of said pipe, whereby said pipe is heated by the secondary current flowing through the inner wall portion thereof on account of the skin effect and the outersurface portion of said pipe receives solely the heat so generated without any substantial amount of electric current flow therethrough.

8. A method for heating a surface of wall or floor of construction comprising heating said surface with a heat generating pipe having an arrangement including a primary circuit of an electric conductor line connected to a source of A.C. supply and inserted within at least one pipe of ferromagnetic metal throughout the entire length thereof in electrically insulated relation from the inner wall portion of said pipe and a secondary circuit consisting of said at least one pipe of ferromagnetic metal and at least one conductor having an impedance as low as possible and connecting the ends of said pipe, the secondary alternating current induced in the secondary circuit by the primary current being concentrated on the inner wall portion of said pipe on account of the skin effect while satisfying the relations expressed by equations, $$S = 5030\sqrt{\frac{\rho}{\mu f}}$$

$$t > 2S$$

$$D \gg S$$

$$l \gg D$$

wherein S is a penetration depth (cm.) of the current flowing the pipe of ferromagnetic metal on account of the skin effect, $\rho$ is a resistivity ($\Omega$-cm.) of the material of said pipe, $\mu$ is the magnetic permeability, $f$ is a frequency (cycles/sec.) of said pipe, D is an inside diameter (cm.) of said pipe and $l$ is a length (cm.) of said pipe, whereby said pipe is heated by the secondary current flowing through the inner wall portion thereof on account of the skin effect and the outer surface portion of said pipe receives solely the heat so generated without any substantial amount of electric current flow therethrough.

9. A method for heating a surface of road comprising heating said surface with a heat generating pipe having an arrangement including a primary circuit of an electric conductor line connected to a source of A.C. supply and inserted within at least one pipe of ferromagnetic metal throughout the entire length thereof in electrically insulated relation from the inner wall portion of said pipe and a secondary circuit consisting of said at least one pipe of ferromagnetic metal and at least one conductor having an impedance as low as possible and connecting the ends of said pipe, the secondary alternating current induced in the secondary circuit by the primary current being concentrated on the inner wall portion of said pipe on account of the skin effect while satisfying the relations expressed by equations, $$S = 5030\sqrt{\frac{\rho}{\mu f}}$$

$$t > 2S$$

$$D \gg S$$

$$l \gg D$$

wherein S is a penetration depth (cm.) of the current flowing the pipe of ferromagnetic metal on account of the skin effect, $\rho$ is a resistivity ($\Omega$-cm.) of the material of said pipe, $\mu$ is the magnetic permeability, $f$ is a frequency (cycles/sec.) of said pipe, D is an inside diameter (cm.) of said pipe and $l$ is a length (cm.) of said pipe, whereby said pipe is heated by the secondary current flowing through the inner wall portion thereof on account of the skin effect and the outer surface portion of said pipe receives solely the heat so generated without any substantial amount of electric current flow therethrough.

10. A method for heating a run field of aircrafts comprising heating said run field with a heat generating pipe having an arrangement including a primary circuit of an electric conductor line connected to a source of A.C. supply and inserted within at least one pipe of ferromagnetic metal throughout the entire length thereof in electrically insulated relation from the inner wall portion of said pipe and a secondary circuit consisting of said at least one pipe of ferromagnetic metal and at least one conductor having an impedance as low as possible and connecting the ends of said pipe, the secondary alternating current induced in the secondary circuit by the primary current being concentrated on the inner wall portion of said pipe on account of the skin effect while satisfying the relations expressed by equations, $$S = 5030\sqrt{\frac{\rho}{\mu f}}$$

$$t > 2S$$

$$D \gg S$$

$$l \gg D$$

wherein S is a penetration depth (cm.) of the current flowing the pipe of ferromagnetic metal on account of the skin effect, $\rho$ is a resistivity ($\Omega$-cm.) of the material of said pipe, $\mu$ is the magnetic permeability, $f$ is a frequency (cycles/sec.) of said pipe, D is an inside diameter (cm.) of said pipe and $l$ is a length (cm.) of said pipe, whereby said pipe is heated by the secondary current flowing through the inner wall portion thereof on account of the skin effect and the outer surface portion of said pipe receives solely the heat so generated without any substantial amount of electric current flow therethrough.

References Cited

UNITED STATES PATENTS

| 2,543,882 | 3/1951 | Tice | 219—10.49 |
| 2,635,168 | 4/1953 | Lerza et al. | 219—10.49 |
| 3,410,977 | 11/1968 | Ando | 219—10.49 |

JOSEPH V. TRUHE, Primary Examiner

L. H. BENDER, Assistant Examiner

U.S. Cl. X.R.

219—6.5, 10.51